United States Patent
Levesque et al.

(10) Patent No.: US 10,033,596 B2
(45) Date of Patent: Jul. 24, 2018

(54) HARDWARE-BASED LICENSING FOR WIRELESS NETWORKS

(71) Applicant: Linear Technology Corporation, Milpitas, CA (US)

(72) Inventors: Alain Pierre Levesque, Pleasanton, CA (US); Lance Robert Doherty, San Leandro, CA (US)

(73) Assignee: Linear Technology LLC, Milpitas, CA (US)

( * ) Notice: Subject to any disclaimer, the term of this patent is extended or adjusted under 35 U.S.C. 154(b) by 0 days.

(21) Appl. No.: 14/682,054

(22) Filed: Apr. 8, 2015

(65) Prior Publication Data

US 2015/0295786 A1 Oct. 15, 2015

Related U.S. Application Data

(60) Provisional application No. 61/977,486, filed on Apr. 9, 2014.

(51) Int. Cl.
*H04W 12/06* (2009.01)
*H04W 12/12* (2009.01)
*H04W 12/08* (2009.01)
*H04W 84/18* (2009.01)
(Continued)

(52) U.S. Cl.
CPC .......... *H04L 41/5019* (2013.01); *G06F 21/10* (2013.01); *G06Q 30/018* (2013.01);
(Continued)

(58) Field of Classification Search
CPC ............... H04W 84/18; H04L 41/0803; H04L 41/0806; H04L 41/5019; H04L 41/5045
(Continued)

(56) References Cited

U.S. PATENT DOCUMENTS

2008/0133289 A1\* 6/2008 Armour ................ G06Q 10/06
705/311
2009/0055835 A1 2/2009 Zhu
(Continued)

FOREIGN PATENT DOCUMENTS

WO 2009024921 A2 2/2009

OTHER PUBLICATIONS

Extended European Search Report dated Sep. 8, 2015, issued in European Application No. 15000998.3.

*Primary Examiner* — Inder Mehra
(74) *Attorney, Agent, or Firm* — McDermott Will & Emery LLP

(57) ABSTRACT

A wireless mesh network is provided with equipment and methods for monitoring and enforcement of license terms. The network includes a plurality of wireless network nodes, a wireless access point, and a network manager in communication with the access point and with the network nodes via the access point. At least one of the network nodes and the access point includes license information embedded in the device hardware, and the network manager provides services to the wireless network subject to license terms determined based on the license information embedded within the network node or access point. Additionally, the network manager is in communication with a user application external to the network, and relays communication between the user application and the wireless network. The network manager modulates communications relayed between the user application and the wireless network subject to the license information embedded within the network node or access point.

19 Claims, 3 Drawing Sheets

(51) Int. Cl.
*G06F 21/10* (2013.01)
*H04L 12/24* (2006.01)
*H04L 29/06* (2006.01)
*G06Q 30/00* (2012.01)

(52) U.S. Cl.
CPC .......... *H04L 41/12* (2013.01); *H04L 41/5006* (2013.01); *H04L 41/5045* (2013.01); *H04L 63/20* (2013.01); *H04W 12/06* (2013.01); *H04W 12/08* (2013.01); *H04W 12/12* (2013.01); *H04L 2463/101* (2013.01); *H04L 2463/103* (2013.01); *H04W 84/18* (2013.01)

(58) Field of Classification Search
USPC ........ 370/329, 254, 252, 259; 455/509, 410, 455/411; 380/247, 248, 249, 250, 270
See application file for complete search history.

(56) References Cited

U.S. PATENT DOCUMENTS

| | | | |
|---|---|---|---|
| 2009/0089864 | A1 | 4/2009 | Tyrrell et al. |
| 2010/0067705 | A1* | 3/2010 | Boccon-Gibod ....... G06F 21/10 380/285 |
| 2011/0107417 | A1* | 5/2011 | Balay .................. H04L 63/1466 726/22 |
| 2012/0072995 | A1* | 3/2012 | Crawford .............. G06F 21/105 726/26 |
| 2013/0272226 | A1* | 10/2013 | Li ......................... H04W 28/26 370/329 |
| 2015/0026052 | A1* | 1/2015 | Bodman ................ G06Q 20/28 705/42 |
| 2017/0344980 | A1* | 11/2017 | Koka .................... G06Q 30/06 |

* cited by examiner

HARDWARE-BASED LICENSING FOR WIRELESS NETWORKS

CROSS-REFERENCE TO RELATED APPLICATION

This application claims the benefit of priority of U.S. Provisional Application No. 61/977,486, entitled "Hardware-Based Licensing for Wireless Networks" and filed Apr. 9, 2014, the disclosure of which is incorporated by reference herein in its entirety.

TECHNICAL FIELD

The present subject matter relates to equipment and techniques for monitoring and enforcement of license terms in wireless mesh networks.

BACKGROUND

Wireless mesh networks provide a high level of flexibility in network design and in the resulting range of applications that the networks can be used for. In the networks, nodes automatically detect and establish communications with neighboring nodes to form the wireless mesh. Network access points (APs) serve as gateways between the wireless mesh network and elements external to the mesh network. A network manager can coordinate the operation of the wireless mesh network, such as to coordinate the timing of the nodes.

In one example, nodes of a wireless mesh network each include a sensor and are operative to relay sensor data measurement through the network. In the example, the network access point provides an interface between the wireless mesh network and an external network (e.g., a local area network (LAN)), and enables a computer connected to the external network to receive the sensor data measurement from all of the wireless mesh network nodes.

Designers and manufacturers of wireless mesh network equipment have developed advanced wireless network nodes, access points, and network managers that are capable of providing a broad range of network services. For example, the nodes, access points, and network managers may be capable of operating with very large networks including numerous nodes, of providing high network data throughput, of enabling upstream and downstream communications through the network, etc. In order to monetize the design and development costs associated with the networks, the designers and manufacturers sell licenses providing selective access to the advanced features of the networking equipment. The licenses impose limits on the services provided by the nodes, access points, and network managers such that the nodes, access points, and network managers can only be used for those selected features that the licenses authorize.

This disclosure details improved equipment and methods for monitoring and enforcing license terms in wireless mesh networks.

SUMMARY

The teachings herein alleviate one or more of the above noted problems by providing enhanced equipment and methods for monitoring and enforcement of license terms.

In accordance with one aspect of the disclosure, a system includes a plurality of network nodes, a wireless network access point, and a network manager. The plurality of network nodes are configured for wireless communication with each other across the wireless network, and each network node includes a processor, a memory, and a wireless transceiver. The wireless network access point is configured for wireless communication with the network nodes of the wireless network and for communication with a network manager, and the wireless network access point includes a processor, a memory, and a wireless transceiver. The network manager is in communication with the wireless network access point, and is operative to manage operation of the wireless network. At least one of the plurality of network nodes and the wireless network access point includes license information embedded therein, and the network manager provides services to the wireless network subject to license terms determined based on the license information embedded within the at least one of the plurality of network nodes and the wireless network access point.

The network manager may be in communication with a user application external to the network, and the network manager may provide a gateway for relaying communication between the user application and the wireless network nodes or access point. The network manager may further modulate communications relayed between the user application and the wireless network nodes or access point subject to the license terms determined based on the license information embedded within the at least one of the plurality of network nodes and the wireless network access point.

The network manager may receive, from the at least one of the wireless network access point and the node, identifying information for the at least one of the wireless network access point and the node. The network manager may validate the received license information using the received license information, the identifying information for the at least one of the wireless network access point and the node, and an encryption key.

The providing of services by the network manager to the wireless network subject to license terms may include the network manager limiting at least one of: a total number of nodes or access points (APs) from which notifications received from the nodes or APs are published by the network manager to applications external to the wireless network; a total number of nodes or APs to which notifications received from applications external to the wireless network are published by the network manager; a maximum rate at which notifications received from the nodes or APs are published by the network manager to applications external to the wireless network; a maximum rate at which notifications received from applications external to the wireless network are published to the nodes or APs of the wireless network by the network manager; a maximum number of peer-to-peer sessions established between nodes or APs of the wireless network; and a maximum hop-depth of the wireless network.

In response to the network manager determining that at least one wireless network access point or node having embedded license information has left the wireless network, the network manager may establish revised license terms determined based on license information embedded within wireless network access points and nodes that remain joined to the wireless network, and the network manager may provide services to the wireless network subject to the revised license terms.

In accordance with a further aspect of the disclosure, a method includes establishing, in a wireless network manager connected to a wireless network access point, a wireless network including the wireless network access point. A network joining message is received from a node in wireless communication with the network access point, and the node is authenticated and joined to the established wireless network. License information embedded within the at least one of the wireless network access point and the node is received in the network manager from at least one of the wireless network access point and the node. In turn, services are provided by the network manager to the established wireless network, subject to license terms determined based on the license information embedded within the at least one of the wireless network access point and the node.

The method may further include relaying, via the network manager, communications between the wireless network node or access point and a user application external to the wireless network. The relaying of communications may include at least one of relaying communications from the wireless network node or access point to the user application and relaying communications from the user application to the wireless network node or access point. The providing of services, by the network manager to the established wireless network, subject to licensing terms may include modulating by the network manager of communications relayed between the wireless network node or access point and the user application subject to license terms of the license information.

The method may further include receiving in the network manager, from the at least one of the wireless network access point and the node, identifying information for the at least one of the wireless network access point and the node, and validating the received license information using the received license information, the identifying information for the at least one of the wireless network access point and the node, and an encryption key.

The providing of services, by the network manager to the established wireless network, subject to license terms may include the network manager limiting at least one of: a total number of nodes or access points (APs) from which notifications received from the nodes or APs are published by the network manager to applications external to the wireless network; a total number of nodes or APs to which notifications received from applications external to the wireless network are published by the network manager; a maximum rate at which notifications received from the nodes or APs are published by the network manager to applications external to the wireless network; a maximum rate at which notifications received from applications external to the wireless network are published to the nodes or APs of the wireless network by the network manager; a maximum number of peer-to-peer sessions established between nodes or APs of the wireless network; and a maximum hop-depth of the wireless network.

The method may further include determining, by the network manager, that at least one wireless network access point or node having embedded license information has left the wireless network. In response to the determining, revised license terms may be established based on license information embedded within wireless network access points and nodes that remain joined to the wireless network. Services may then be provided by the network manager to the wireless network subject to the revised license terms.

In accordance with a further aspect of the disclosure, a method includes establishing, in a wireless network manager connected to a wireless network access point, a wireless network including the wireless network access point. A network joining message is received from a node in wireless communication with the network access point, and the node is authenticated and joined to the established wireless network. Communications between the wireless network node or access point and a user application external to the wireless network are relayed via the network manager. The relaying of communications includes at least one of relaying communications from the wireless network node or access point to the user application and relaying communications from the user application to the wireless network node or access point. The network manager modulates communications relayed between the wireless network node or access point and the user application subject to license terms for the established wireless network.

The method may further include receiving in the network manager, from at least one of the wireless network access point or node, license information embedded within the at least one of the wireless network access point or node, where the network manager modulates communications relayed between the wireless network node or access point and the user application subject to license terms for the established wireless network determined based on the received embedded license information.

The method may further include receiving in the network manager, from the at least one of the wireless network access point or node, identifying information for the at least one of the wireless network access point or node; and validating the received license information using the received license information, the identifying information for the at least one of the wireless network access point or node, and an encryption key.

The network manager modulating of communications relayed between the wireless network node or access point and the user application subject to license terms for the established wireless network may include the network manager limiting at least one of: a total number of nodes or access points (APs) from which notifications received from the nodes or APs are published by the network manager to the user application; a total number of nodes or APs to which notifications received from the user application are published by the network manager; a maximum rate at which notifications received from the nodes or APs are published by the network manager to the user application; a maximum rate at which notifications received from the user application are published to the nodes or APs of the wireless network by the network manager.

The method may further include determining, by the network manager, that at least one wireless network access point or node having embedded license information has left the wireless network; in response to the determining, establishing revised license terms determined based on license information embedded within wireless network access points and nodes that remain joined to the wireless network; and providing services, by the network manager to the wireless network, subject to the revised license terms.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
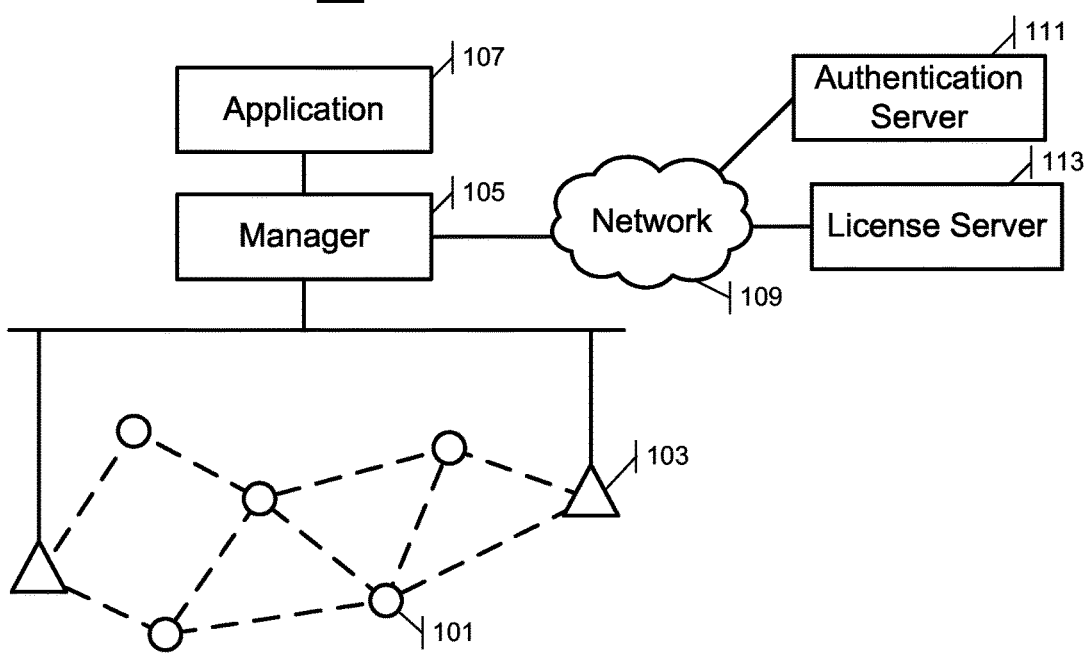
FIG. 1 shows a high-level functional block diagram of an example of a system including a network that provides hardware-based licensing functionalities.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to the monitoring and enforcement of license terms in wireless mesh networks.

Wireless networks include pluralities of nodes, access points (APs), and other wireless network devices that are distributed in space and communicate wirelessly with each other. A network manager coordinates the operation of the wireless network devices to efficiently communicate with each other, and relays data and other information between the network and outside devices. The operation of the network and its devices may be subject to license terms, such as terms that limit the number of nodes/devices in the network, the speed and/or amount of data communicated to/from/in the network, or the like. More generally, the license terms can impose limits on the types of services provided by the network and the performance of network components.

In general, a customer obtains a license from a reseller, a manufacturer, a factory or the like. The license may take the form of a license code, and the customer inputs the license code to the network manager prior to starting the network. The network manager is thereby authorized for operation of a network according to the license terms associated with the license code input by the customer. This licensing scheme may require a certain level of advance planning since the network size, network speed, and/or other network performance parameters imposed by the license are fixed at network boot time based on the license code provided by the customer. Additionally, the licensing scheme may require that the customer have a high level of software-related competency in order to correctly input the license code information and ensure that the network manager successfully obtains the related license authorizations. Further, to ensure that a same license code is not concurrently used in multiple different networks, advanced verification methods may be needed. Advantageously, the licensing scheme enables a manufacturer to monetize network devices by charging various premiums for augmenting the network manager beyond the default capabilities through a software license that the user sets after obtaining it from the factory.

To provide seamless license verification and greater flexibility in expanding or changing license terms during operation of the network, the license information can be embedded in network nodes, network APs, or other physical devices of the network (generally referenced as wireless network devices). In this regard, the license can be a hardware-based license, whereby the license is linked to, associated with, and permanently stored in a physical/hardware network element that can join or leave the network. The license information can then be automatically provided by the nodes, APs, or other network devices to the network manager, for example at the time the nodes, APs, or other devices join the network. The network manager may further automatically detect if any node, AP, or other device leaves the network, and revise the terms of the license under which the network manager operates to reflect the departed node, AP, or other device. The initial provision and updating of the license information can be performed seamlessly and in real-time during operation of the network, and may thereby enable the license terms to be changed dynamically at any time as devices join or leave the wireless network.

The use of the hardware-based license is advantageous for a number of reasons. For example, it is straightforward to implement and enforce from the manufacturers' perspective. It is straightforward to use from the customer perspective and allows for great flexibility when reconfiguring or redistributing hardware between different networks. It decouples network functionality from any particular manager (notably as it relates to functions controlled/limited under the license terms), enabling the license information to be readily carried over to a new manager in case an existing manager has to be replaced (e.g., for maintenance reasons). It increases the ability for customers to provision and expand networks on an as needed basis. Additionally, licenses can be monetized through individual part numbers representative of the device-carrying licenses. Further, as detailed below, licenses can be verified and validated without requiring a central license manager, and without the risk of a same license being used concurrently in multiple networks.

FIG. 1 shows a high-level functional block diagram of an example of a system 100 including a mesh network that provides hardware-based licensing functionalities.

As shown in the figure, a mesh network includes a plurality of network nodes 101 (illustratively shown as circles) that communicate with each other across wireless network communication links (illustratively shown as dashed lines). The network nodes also communicate wirelessly with one or more network access points (APs) 103. The APs 103 serve as physical gateways between the mesh network and the outside of the mesh network. For example, any data or information being communicated from the mesh network to the outside is routed through an AP 103; conversely, any data or information being communicated from the outside to the mesh network is also routed through an AP 103. An AP can thus receive wireless packets from the nodes and send the packets over the wired network to the network manager, and receive packets over the wired network and transmit the packets wirelessly over the wireless network to the nodes.

In the embodiment shown in FIG. 1, the APs 103 are shown as communicating wirelessly to one or more of the network nodes of the mesh network, and communicating via wires (illustratively shown as full lines) with the outside. In other embodiments, the mesh network may be a wired network, and/or the APs 103 may communicate over wireless links with the outside.

In addition to the nodes 101 and AP(s) 103, the mesh network includes a network manager 105 communicatively connected to one or more AP(s) 103 (e.g., though a wired link). The centralized network manager 105 is responsible for controlling the mesh network and for determining which devices can join the network. Specifically, the network manager 105 provides oversight of the mesh network and controls operation of the network by for example joining nodes to the network, setting network timing, and/or setting a network communication schedule. The network manager 105 further functions as an operational gateway or interface between the mesh network and the outside. In this regard, all communication between the mesh network and the outside is managed by the network manager 105: the network manager 105 may thus provide an interface through which external applications 107 can receive network data and information from the network, and through which the external applications 107 can send data, information, or commands to the wireless network.

The network manager 105 can further perform authentication, licensing, and other functions. For such purposes, the network manager 105 can optionally be communicatively connected to an authentication server 111, a license server 113, and/or various other servers or entities. In FIG. 1, the network manager 105 is shown as being directly physically connected to the application 107 and the APs 103 through wired network links, and indirectly connected to the servers 111, 113, through the network 109. More generally, however, the network manager 105 may communicate with the servers 111, 113, with the AP(s) 103, and/or with the application(s) 107 through one or more networks 109 (e.g., a local or wide area network (LAN/WAN), an Ethernet network, a Wi-Fi network, a mobile communication network, the Internet, or the like). Alternatively, the network manager 105 may be co-located (e.g., in a same device) with an AP 103 or an application 107, and execute on the same processor as or a distinct processor from the AP 103 or application 107. The network manager 105 may also communicate with APs 103 or applications 107 through one or more network(s) 109, and/or be directly communicatively connected to the servers 111, 113. For example, in some embodiments, additional wireless links (such as WiFi, cell phone, or microwave links) may be used to connect APs 103 to each other or to the network manager 105.

In one example, the mesh network is a wireless sensor network that enables wireless collection of application data from multiple nodes serving as sensing points. The network establishes a mesh of links between the nodes, and data is communicated across multi-hop links between the nodes 101 and the AP(s) 103. Data from distant nodes 101 is collected automatically by the mesh by having each node 101 relay data packets received from other nodes, such that the packets gradually move a little bit closer to their intended destination (e.g., an AP 103 or a particular other node 101).

Each transmission and reception of a data packet directly from one node to a neighbor node or neighbor AP is called a hop, and in general data packets will take different multi-hop routes through the mesh to their destination (e.g., an AP 103 or another node 101). The particular multi-hop route followed by any packet may depend on path stability of paths along the route and on network communication schedules (e.g., schedules defining when each node in the network can send or can receive packets across the network). By a similar process, application or control data can be sent out in the opposite direction from an AP 103 to any particular node 101 of the mesh network.

Figure 2:
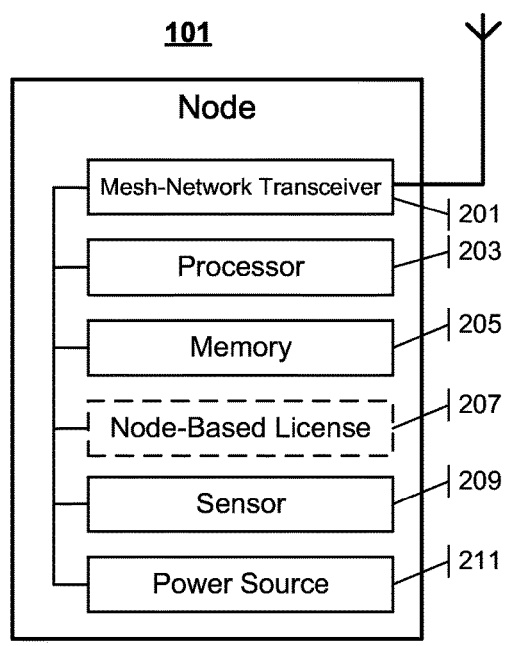
FIG. 2 shows a high-level functional block diagram of an example of a wireless node such as may be used in the network system of FIG. 1.

FIG. 2 shows a high-level functional block diagram of an example of a node 101 used in the network system 100 of FIG. 1. The node 101 includes a processor 203 (e.g., a microprocessor) and a memory 205 that provide processing capabilities. The memory 205 stores application programs and instructions for controlling operation of the node 101, and the processor 203 is configured to execute the application programs and instructions stored in the memory 205. A power source 211, such as a battery, transformer, solar cell(s), dynamo, or the like, provides electric power for powering the operation of the node 101.

Additionally, the node 101 can include a sensor 209 producing sensing or measurement data that is provided to the processor 203 and/or stored in memory 205. The node 101 can additionally or alternatively include an actuator (e.g., a motor, valve, or the like) or other operational output (e.g., a display) that is controlled by the processor 203. The node 101 further includes a transceiver 201 that enables communication across the network (e.g., a wireless mesh-network) with other nodes 101 or APs 103. As shown in FIG. 2, the transceiver 201 is a wireless transceiver 201 connected to an antenna and configured for wireless communication; in other embodiments, the transceiver 201 may be a wired transceiver. The various components of the node 101 are communicatively connected to each other (e.g., via a bus or other communication lines), and are electrically connected to the power source 211 to receive operating power.

As described in further detail below, the node 101 can optionally include an embedded node-based license 207. The node-based license 207 generally is a data string that encodes or is associated with a particular set of license terms and conditions, and that enables a user of the node to use the node and to use any network joined by the node subject to the associated license terms and conditions encoded by the license 207. The node-based license 207 can thus include license information that is stored in a nonvolatile memory, such as a one-time programmable memory or a flash memory, of the node 101. The license information is generally stored or written into the nonvolatile memory at the factory during production of the node, and is not directly accessible to or editable by the end-user.

Further functions relating to the node-based license 207 are described in further detail below.

Figure 3:
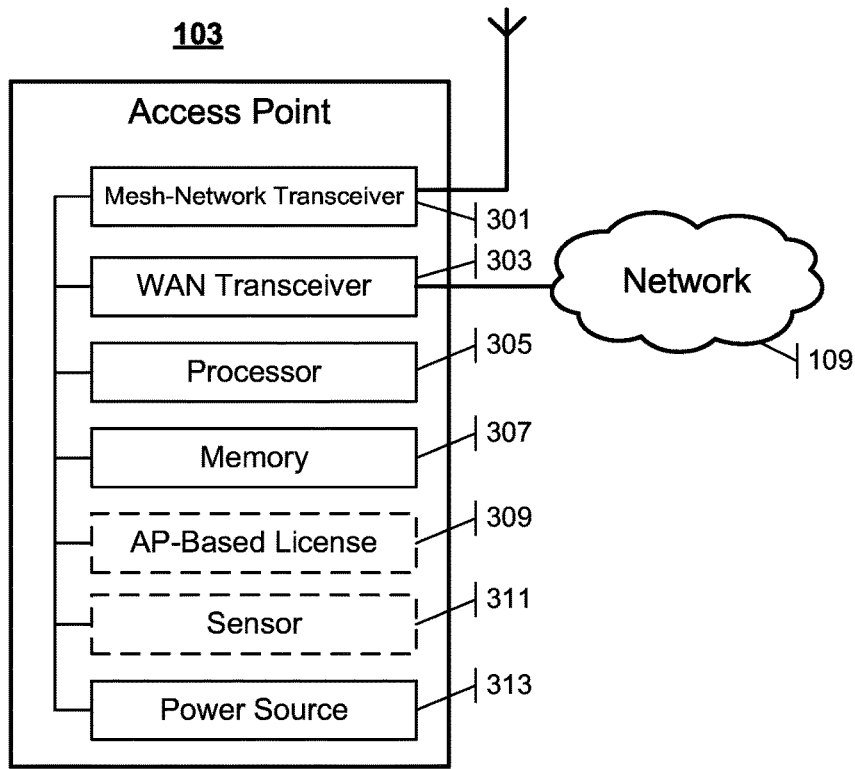
FIG. 3 shows a high-level functional block diagram of an example of an access point (AP) such as may be used in the network system of FIG. 1.

FIG. 3 shows a high-level functional block diagram of an example of an AP 103 used in the network system 100 of FIG. 1. The AP 103 includes components substantially similar to those of the node 101, including a mesh-network transceiver 301, a processor 305 (e.g., a microprocessor), a memory 307, a sensor 311, and a power source 313. Such components of the AP 103 are substantially similar to corresponding components of the node 101, and reference can be made to the description of the node 101 for detailed information on the components and their function. The AP 103 optionally includes a sensor 311, actuator, or other operational output that is controlled by the processor 305, similarly to the node 101.

Additionally, the AP 103 can include dual transceivers: a first transceiver 301 (e.g., a mesh-network transceiver) configured for communication with nodes 101 of the network, and a second transceiver 303 (e.g., a WAN transceiver) configured for communication outside of the mesh-network such as communications with the network manager 105 or application(s) 107 (e.g., via the network manager 105). In our example, the first transceiver 301 may be a wireless transceiver, while the second transceiver 303 may be a transceiver configured for wired communications (e.g., a transceiver compatible with Ethernet standards) directly with the network manager 105 or indirectly via one or more network(s) 109. While two transceivers are shown in FIG. 3, some embodiments may include a single transceiver performing both communications functions, while in other embodiments communications with the network manager 105 may be via a direct wired link.

The AP 103 can optionally include an embedded AP-based license 309. The AP-based license 309 may be similar to the node-based license 207 described above and used in a similar manner. The AP-based license 309 generally is a data string that is associated with a particular set of license terms and conditions, and that enables a user of the AP 103 to use the AP and to use any network joined by the AP subject to those associated license terms and conditions. The AP-based license 309 can thus include license information that is stored in a nonvolatile memory, such as a one-time programmable memory or a flash memory, of the AP 103. The license information is generally stored or written into the nonvolatile memory at the factory during production of the AP, and is not accessible to or editable by the end-user.

In some examples, each node, AP, or other network device operates in two modes. In a low-power "sleep" mode, the device consumes a minimal amount of power but has limited functionality. In an "awake" mode, the device has full functionality but consumes larger amounts of power. Each device may only be "awake" for limited periods of time, so as to keep device power consumption as low as possible. The device may be awake only during time periods identified in the network communication schedule during which the device is scheduled to send or receive data, and during time periods during which the device is scheduled to perform sensor measurements or perform other functions.

Figure 4:
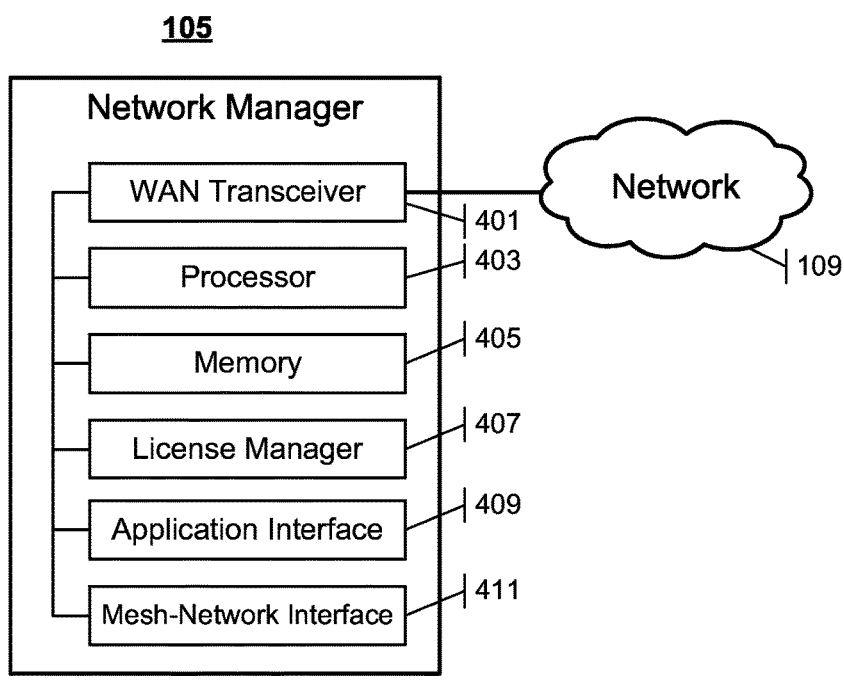
FIG. 4 shows a high-level functional block diagram of an example of a network manager such as may be used in the network system of FIG. 1.

FIG. 4 shows a high-level functional block diagram of an example of a network manager 105 used in the network system 100 of FIG. 1. The network manager 105 controls operations of the mesh network, and serves as an interface between the network and the outside (e.g., as an interface between the network and external application(s) 107). Specifically, all communications between the mesh network and external applications 107 may flow through the network manager 105, or otherwise be controlled by the network manager 105.

The network manager 105 is shown in FIG. 1 as being a separate entity from the AP 103, and as being physically separate from any AP 103. In such embodiments, the network manager 105 and AP(s) 103 are separate entities and may be communicatively connected via a communication cable (as shown), one or more wired or wireless network(s), and/or one or more wireless communication links. In other embodiments, the network manager 105 may be co-located with one AP 103, for example within a same device casing. In such embodiments, the network manager 105 and AP 103 may have distinct processors, may be mounted on distinct circuit boards, and may be communicatively connected by wire traces between the circuit boards. In further embodiments, the network manager 105 may execute on a same processor as an AP 103.

The network manager 105 includes a processor 403 (e.g., a microprocessor) and a memory 405 that provide processing capabilities. The memory 405 stores application programs and instructions for controlling operation of the network manager 105, and the processor 403 is configured to execute the application programs and instructions stored in the memory 405 and control operation of the manager 105.

Additionally, the network manager 105 includes a communication interface such as a transceiver 401 for communication via network(s) 109. While a single transceiver 401 is shown in FIG. 4, the network manager 105 can include multiple transceivers, for example in situations in which the network manager 105 communicates using different communications standards or protocols, or using different networks or communications links, with the AP(s) 103, the application(s) 107, and/or the servers 111, 113. For instance, a dedicated communication interface 411 (e.g., a dedicated port) can be included for communication with the AP(s) 103 of the mesh network. As shown in FIG. 4, the transceiver 401 is a wired transceiver connected to network 109; in other embodiments, the network manager 105 includes one or more wireless transceivers connected to antennas and configured for wireless communication.

The various components of the network manager 105 are communicatively connected to each other (e.g., via a bus or other communication lines), and are electrically connected to a power source to receive operating power.

The network manager 105 provides oversight of the mesh network, and can control operation of the network. For example, the network manager 105 joins nodes to the network, sets network timing and/or sets a network communication schedule, and performs other network administration based on program instructions stored in memory 405 and executed on processor 403. In addition, as part of joining nodes and APs to the network, the network manager 105 can receive identification information from nodes 101 and AP(s) 103 and can authenticate the nodes and AP(s) based on the identification information. In some examples, the authentication is performed in concert with the authentication server 111 by transmitting the identification information to the authentication server 111 and obtaining an authentication confirmation or an authentication denial from the server 111. In other examples, the authentication is performed locally by the network manager 105 based on the identification information.

Additionally, the network manager 105 performs network license verification, management, and enforcement. For this purpose, the license manager 407 may be executed on processor 403 or on a dedicated processor. The license manager 407 obtains license information from one or more node(s) 101 and/or AP(s) 103 of the network it is associated with, such as license information from a node-based license 207 or an AP-based license 309. The license manager 407 then verifies or authenticates the license information to determine its accurateness and authenticity, and determines the license terms associated with the authenticated license information. The license manager 407 may authenticate the license information and determine license terms through local processing alone; alternatively, the license manager may communicate with license server 113 to perform these operations. In one example, the license manager 407 transmits the license information to the license server 113 and obtains in response a license confirmation identifying the license terms (or providing a license denial) from the server 113. The license manager 407 then controls operation of the network manager 105 to ensure that the network license terms are respected and enforced by the network manager 105.

The network manager 105 further functions as an operational gateway or interface between the mesh network and the outside—and in particular as an interface for application(s) 107 interfacing with the mesh network AP(s) and/or nodes. For this purpose, the application interface 409 may be executed on processor 403. The application interface 409 can receive data and information from the network (e.g., from AP(s) 103, and/or from nodes 101 via the AP(s)), format or process the data to put it in a format useable by the application(s) 107, and provide the raw or processed data to the application(s) 107. The application interface 409 can further receive data, information, or control information from the application(s) 107, format and process the data, information, or controls to put them in a format useable by the AP(s) 103 and nodes 101, and provide the processed data, information, or controls to the AP(s) 103 and nodes 101.

The license terms enforced by the license manager can include a variety of limits on the operation of the mesh-network and on the information communicated to and from the mesh network. In some examples, the license terms and conditions authorize or limit the number of wireless devices (nodes and APs) that can join the network, and/or authorize or limit the features that are authorized for use by these joined devices and the network managers. Specifically, the license terms will generally limit the features and services provided by the application manager 105 such that only a subset of the features and services that the application manager 105 is capable of providing are in fact provided subject to the license terms (e.g., except when a full license providing access to all features and services is verified and implemented by the license manger 407).

In general, the license terms will authorize any number of wireless devices to join the network (subject to any operational limits, such as a maximum number of devices that can be used in a network because of limits in the network's addressing convention). The license terms may instead limit the number of wireless devices (e.g., from nodes 101 and AP(s) 103) from which data can be obtained and relayed to external applications 107 via the network manager 105, and/or limit the number of wireless devices to which data and controls can be sent (e.g., data and controls received by the network manager 105 from application(s) 107). Additionally or alternatively, the license terms may limit the use of any number of features implemented or controlled by the network manager 105.

In this respect, the network manager 105 operatively sits between the wireless sensor network and the customer application 107. In some embodiments the manager 105 and the customer application 107 both run on the same processor. The application 107 is generally concerned with collecting "upstream" data from the sensors attached to nodes 101 and APs 103, and the manager 105 publishes this data to the application 107 through notifications which wrap up the data in messages the application can consume. Ultimately, the manager 105 is in control of publishing the notifications and can throttle them if a maximum number of nodes, a maximum data rate, or another feature allowed according to the license terms is exceeded. In this regard, while the data rate is subject to the physical limits of how many packets can be sent through the network per unit time, the network manager 105 may impose a lower license-based logical limit below the physical limit on the information communicated to or from the application 107. The network manager 105 can further impose a lower license-based logical limit below the physical limit on the information communicated between network nodes 101 and APs 103, for example by slowing network timing, providing fewer wireless links in the network communication schedule (e.g., one that limits nodes' and APs' transmit and receive opportunities), or the like.

The application 107 can also send messages to the nodes 101 or APs 103 "downstream" over the wireless network. Again, these messages pass through the network manager 105 and can thus be limited by the network manager 105. For example, the rate of messages can be limited, or the destinations of the messages can be limited (e.g., such that messages can only be sent to a limited number of nodes or APs).

In some examples, nodes in the network may also talk to each other without intervention by the network manager 105, for example such that a flow sensor in one node can talk to and control a valve actuator in another node via a control application. In such situations, the network manager 105 can still be responsible for setting up the security sessions and installing the bandwidth required for these "peer-to-peer" applications or interactions between nodes or APs. In such cases, the network manager 105 can selectively assign session keys to either endpoint of the peer-to-peer route and/or selectively assign links in the mesh (potentially spanning several hops) between the two endpoints subject to license terms determined by the license manager 407. As such, the network manager 105 under the control of the license manager 407 may not assign a session key, may not assign appropriate links, and/or may limit communication opportunities between the nodes or APs (e.g., by changing the network connectivity map or the network timing schedule) if license terms do not authorize the particular peer-to-peer application between the nodes. Conversely, the network manager 105 under the control of the license manager 407 may assign the appropriate session keys, links, and communication opportunities if the license terms authorize the peer-to-peer application.

Hence, as detailed above, because the network manager 105 sits in the middle of all of this functionality, the network manager 105 may be designed to include the license manager 407 that serves as a license authentication and verification system to authorize certain capabilities as provided for by a license authorization certificate. Examples of some capabilities that may be authorized subject to license terms and conditions in response to a valid license include, but are not limited to:

(a) Imposing a license-based maximum number (e.g., an integer 'n') of nodes from which data notifications are published. In such situations, the network manager 105 may allow more than the maximum number of nodes or APs to join the network, but may only allow data (e.g., sensor data) from the maximum number of nodes to be provided to the application(s) 107. The network manager 105 may randomly select 'n' nodes from which notification are published from among all of the nodes in the network; may select the first 'n' nodes to have been joined to the network (i.e., the 'n' nodes having joined the network the longest time ago); may select the last 'n' nodes to have been joined to the network (i.e., the 'n' nodes having most recently joined the network); may select the first 'n' nodes to provide data for publication to the network manager 105; or the like. The license-based maximum number may also limit the number of nodes and APs to which notifications and other traffic (e.g., controls) can be provided downstream from applications 107.

(b) Imposing a maximum rate at which notifications can be published from the network (e.g., measured in packets per second or bytes per second) to applications 107. Alternatively, a maximum total number of packets or number of bytes that can be published from the network to the applications 107 can be imposed (e.g., such that the license blocks further network use once the maximum is reached).

(c) Imposing a maximum number of peer-to-peer sessions between nodes and/or APs, or imposing a maximum number of nodes or APs that are capable or allowed to perform peer-to-peer communications between nodes or APs.

(d) Imposing a maximum rate at which notifications or other traffic (e.g., controls) can be provided downstream from applications 107 to the network devices (nodes and APs), for example measured in packets per second or bytes per second. Alternatively, a maximum total number of notifications, packets, or number of bytes that can be provided to the network devices can be imposed (e.g., such that the license blocks further communications from the applications 107 to the network devices once the maximum is reached).

(e) Imposing a maximum hop-depth of the network, i.e. limiting how far (as measured in hops) the most distant devices can be from the network manager 105 or from one or more APs 103.

(f) Limiting the ability of the network or of network devices to synchronize to UTC time, for example to limit the network or network devices from using global position system (GPS) capabilities or other capabilities based on UTC time.

(g) Enabling or disabling the rapid detection of lost nodes and APs.

(h) Enabling or disabling location-based network services or other non-standard augmentations.

(i) Limiting the number or type of applications 107 to which network data is provided, or from which notifications can be forwarded to network devices.

The license terms may impose limits on zero, one, or multiple of the above capabilities (e.g., capabilities (a)-(i)), and the network manager 105 may authorize (or limit) zero, one, or multiple of the capabilities subject to the license terms determined by the license manager 407.

Note that in some embodiments, the nodes 101 and APs 103 may control peer-to-peer sessions for themselves without ever talking to the network manager 105. In such cases, the license manager 407 of the network manager 105 can still ensure that the license terms and conditions authorize the use of peer-to-peer sessions and, upon determining that peer-to-peer sessions are authorized under the license, communicate approval of the peer-to-peer features to individual nodes 101 and APs 103 or broadcast to the network as a whole. The nodes 101 and APs 103 may be configured to only be able to use the peer-to-peer features after receiving approval from the network manager 105.

Figure 5:
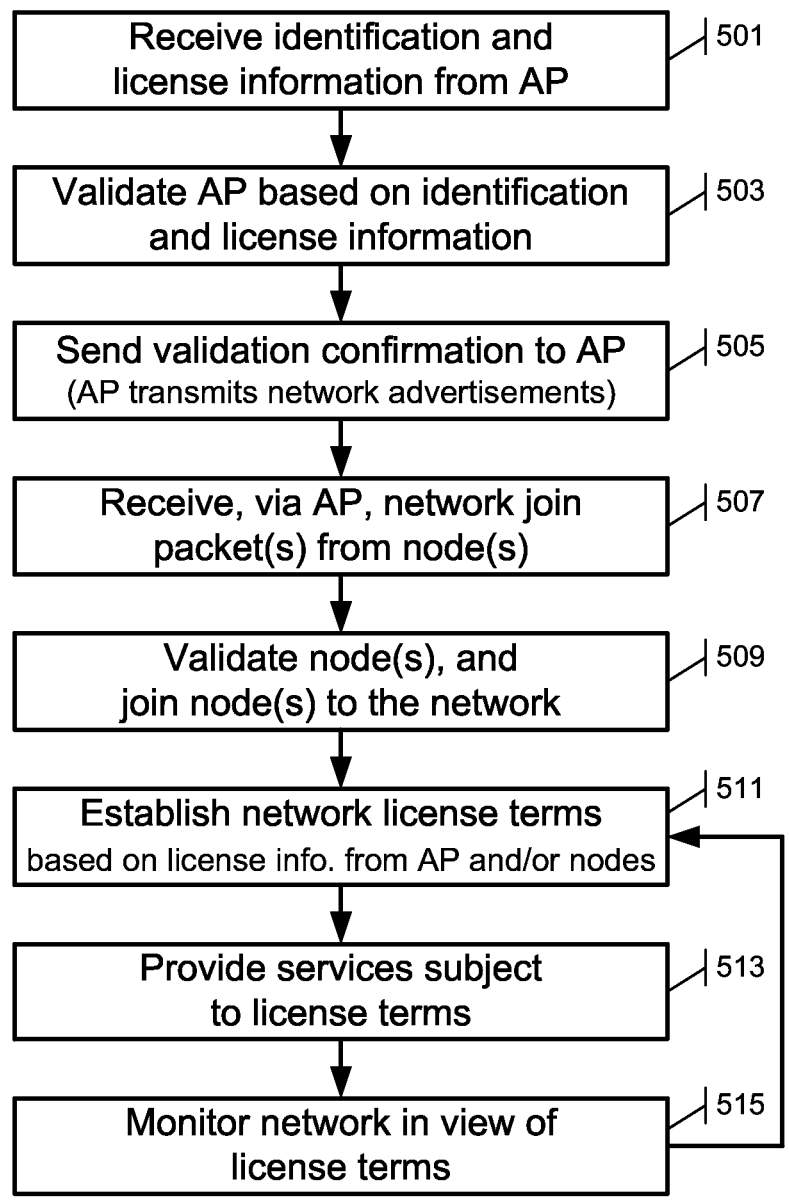
FIG. 5 shows a high-level flow diagram showing steps of a method for monitoring and enforcement of authorization and licensing terms and conditions in a wireless networks, such as the wireless network of the network system of FIG. 1.

FIG. 5 shows a high-level flow diagram showing steps of a method 500 for monitoring and enforcement of authorization and licensing terms and conditions in a wireless network, such as in the wireless mesh network of the network system 100 of FIG. 1.

Method 500 begins with an AP 103 being connected to a network manager 105. The AP 103 begins a registration process with respect to the network manager 105, and provides identification information to the network manager 105 as part of the registration process. The AP 103 may also provide license information to the network manager as part of the registration process, notably in cases in which the AP 103 includes an AP-based license 309. The network manager 105 receives the identification and license information in step 501, and proceeds to perform the validation process in step 503.

As part of the validation of step 503, the network manager 105 may determine whether the AP 103 is a valid AP based on the identification information. The validation may be performed locally by the network manager 105 (e.g., using processor 403) by providing the identification information received from the AP 103 to an AP validation program stored in memory 405 and executed by processor 403. Alternatively, the validation may be performed by transmitting the identification information received from the AP 103 to the authentication server 111 and, in response to the transmission, receiving a validation response from the authentication server 111. If the validation response indicates that the identification information is valid, the validation is successful, and the network manager 105 establishes a new mesh network for the AP 103 and sends a validation confirmation to the AP 103 in step 505. If the validation response indicates that the identification information is invalid, the validation is unsuccessful and the network manager 105 sends a validation failure message to the AP 103.

In cases in which license information is received from the AP 103 in step 501, the validation of step 503 can additionally include a license validation procedure. The license validation can be performed locally by the license manager 407 of the network manager 105 based on the license information received from the AP 103. Alternatively, the validation may be performed by having the license manager 407 transmit the license information received from the AP 103 to the license server 113 and, in response to the transmission, receiving a license validation response from the license server 113. The license validation response generally identifies the license terms associated with the license information received from the AP 103. The license manager 407 stores the received license validation response for use in enforcing the license terms on the network.

In response to receiving the validation confirmation from the network manager in step 505, the AP 103 may begin transmitting network advertisements. The validation confirmation generally includes a unique identifier for the new mesh network that was established in the network manager 105 for the AP 103, as well as network timing information. The AP 103 transmits network advertisements indicative of the network identifier and the network timing information received from the manager 105.

When a node 101 is first powered up, the node searches for a network to join by listening for network advertisements being transmitted in its vicinity. The network advertisements can be transmitted by APs 103 (e.g., in the case of the advertisement of step 505), or by other nodes 101 having been joined to the network (e.g., following completion of step 509). In response to receiving a network advertisement, the node 101 can automatically generate a network join message and transmit the join message to the AP 103 or node 101 from which the network advertisement was received. The join message is relayed through the mesh network to the network manager 105 (e.g., potentially along a multi-hop route), where a security handshake is performed to add the node 101 to the mesh network.

In particular, in the network manager 105, the network join message transmitted by the joining node 101 is received in step 507. The network manager 105 may receive multiple different nodes' join messages in step 507. Each join message includes a unique identifier for the node 101 having generated the message, as well as identification of each node 101 or AP 103 from which a network advertisement was received by the node 101 having generated the join message. Additionally, the join messages may also include license information, notably in cases of join messages generated by nodes 101 that include a node-based license 207.

In response to receiving one or more join messages, the network manager 105 performs a security handshake to add or join the nodes 101 to the mesh network in step 509. The validation process of step 509 can be similar to the validation process of step 503. In particular, the network manager 105 may determine whether the nodes 101 are valid nodes based on the identification information provided by each node. The validation may be performed locally by the network manager 105 (e.g., using processor 403) using a node validation program stored in memory 405. Alternatively, the validation may be performed by transmitting the identification information received from the nodes 101 to the authentication server 111 and, in response to the transmission, receiving a validation response from the authentication server 111. If the validation response indicates that the identification information is valid, the validation is successful, and the network manager 105 joins the node to the network in step 509. If the validation response indicates that the identification information is invalid, the validation is unsuccessful and the network manager 105 does not join the corresponding node 101 to the network.

Once nodes 101 or APs 103 are joined to the network, a network join confirmation message is sent by the network manager 105 to the node or AP. The join confirmation message includes an identifier for the mesh network that the node 101 or AP 103 is joined to, a identifier to be used by the node 101 or AP 103 to identify itself during communications on the network, and network timing information indicating when the node 101 or AP 103 can communicate (e.g., send or receive packets) on the network. In response to receiving the join confirmation, the node 101 or AP 103 begins operation on the network. In some examples, the node 101 notifies the attached sensor and starts to accept sensor data. The node 101 then generates packets with the sensor data as payload to allow them to be routed through the wireless sensor network. The network join confirmation may include a network identifier for the joined node or AP as well as network timing information (e.g., including a network communication schedule).

In addition, in step 511, the license manager 407 of the network manager 105 performs license validation. The license validation can be performed locally by the license manager 407 of the network manager 105. Alternatively, the validation may be performed by having the license manager 407 transmit the license information received from the AP 103 and/or nodes 101 to the license server 113 and, in response to the transmission, receiving one or more license validation responses from the license server 113. The license validation responses identify the license terms associated with the license information received from the nodes 101 and APs 103 jointed to the wireless mesh network, and the license manager 407 may store the received license validation responses for use in enforcing the license terms on the network.

Step 511 may specifically include a step for establishing the network license terms based on one or more sets of license information received from one or more AP(s) 103 or nodes 101. Specifically, the license manager 407 may determine license terms for the network as a whole based on any licenses of individual devices (nodes and APs) of the network. In general, the licenses of individual devices may be cumulative, such that the license terms determined in step 511 are determined based on the sum (or conjunction) of the license terms of each network device having joined the network. In other examples, however, the license terms for the network as a whole may be determined based on the broadest license term of any component of the network. In further examples, license terms may be individualized for different network devices, such that for example nodes of the network having licenses for peer-to-peer communication may be validated for such communications while other nodes of the network that do not have such licenses for peer-to-peer communication may not be validated for such communications.

Once the license terms are determined, the network manager 105 and the license manager 407 ensure that services are provided subject to the license terms in step 513. As noted above, the network manager 105 may for example limit (subject to the license terms) which nodes' 101 and APs' 103 communications or data are relayed to application(s) 107 and/or which nodes 101 and APs 103 can be controlled or communicated to by the application(s) 107. The network manager 105 may further limit the amount or rate of data communicated to/from the nodes 101, APs 103, and application(s) 107. The network manager 105 may further impose other limits on network operation and network services in accordance with the established license terms.

While the description of steps 501-511 above has focused on one AP 103 and one node 101 joining the network, the various steps can be repeated as more nodes 101 and APs 103 detect and join the network. As such, the network manager 105 may manage a network having multiple nodes 101, multiple APs 103, and multiple node-based or AP-based licenses. Further, the license terms may be re-established following the joining of each new node 101 or AP 103 to the network.

During wireless mesh network operation, the network manager 105 continuously monitors the network to join new nodes 101 and APs 103 to the network. The network manager 105 also monitors the network for nodes 101 and APs 103 having left the network. For example, the network manager 105 may determine that a node 101 or AP 103 has left the network when no communication is received from the node 101 or AP 103 during a specified time period (e.g., 10 seconds, 1 minute, or the like). The network manager 105 may also determine that a node 101 or AP 103 has left the network in response to determining that multiple sequential attempts to communicate with the node 101 or AP 103 have failed.

The license manager 407 also continuously monitors the network to determine whether the license terms should be revised, in step 515. For example, in response to determining that a new node or AP has joined the network, the license manager 407 may review license terms in step 511 to determine whether the license terms should be expanded, whether the network size has exceeded the license terms, or the like. Further, in response to determining that a node or AP has left the network, the license manager 407 may review license terms in step 511 to determine whether the license terms should be restricted, notably in cases in which the current license terms are based at least in part on the license information received from the node 101 or AP 103 having left the network. In such situations, the license manager 407 revises the license terms to exclude the license information received from the node 101 or AP 103 having left the network, and provides services subject to the revised license terms in step 513.

As noted above, individual nodes 101 or APs 103 can store node-based or AP-based licenses 207, 309. In general, in any embodiment of system 100, only node-based licenses or AP-based licenses are used (e.g., a combination of node-based and AP-based licenses are generally not used in a same embodiment). However, in some examples, combinations of node-based and AP-based licenses 207, 209 can be used in a same embodiment.

The node-based and AP-based licenses 207, 309 are embedded in respective network devices. The license information is then passed from the respective network device to the network manager 105 as though it is regular network data. For example, the license information can be provided as a payload of a packet transmitted from a node 101 or AP 103 to the network manager 105. The license information can also be provided within the header of a packet (e.g., a join message packet) transmitted from a node 101 or AP 103 to the network manager 105.

The licenses 207, 309 are referenced as hardware-based licenses because they are directly and permanently associated with the hardware devices they are held in—notably with the node 101 or AP 103 in which they are embedded. As such, the license information that each license 207, 309 stores is generally unique to the device (e.g., a node 101 or AP 103) holding the license 207, 309, and can only be used in networks including the device 101, 103 associated with the license. In some examples, the licenses 207, 309 are encoded in dedicated chips or circuits, such as a read-only memory or an application-specific integrated circuit that is in the device 101 or 103. In other examples, the licenses 207, 309 are encoded and stored in a secure part of memory 205 or 307 of the device 101 or 103.

The license may be a string of characters that is a cryptographic combination of the licensed capabilities and a unique identifier of the device. For example, the license string can include 4 bytes encoding the licensed capabilities and 8 bytes encoding the unique IEEE address assigned to the hardware element that the license is embedded in. The output license is then a cryptographic combination resulting in 13 bytes. While in some embodiments the user can type in these 13 bytes on the manager, in hexadecimal format, to activate the license, in general the 13 bytes are embedded in the network device (e.g., a node or AP) and are automatically communicated by the network device to the network manager to activate the license.

The license information stored in individual nodes 101 or APs 103 can be generated using shared private key encryption. The term "shared" here indicates that the program that generates the license contains the same secret key as do all the network manager devices 105 or license servers 113 that the manufacturer ships. The program is used to generate the license information embedded into nodes 101 or APs 103. For example, the program can use the IEEE address of the node or AP as one input, or can use another fixed identifier for the node or AP.

To verify the validity of the license information received from a node 101 or AP 103, the network manager 105 or license server 113 decodes the received license information using the "shared" private key (i.e., the same key as was used to generate the license information). The network manager 105 or license server 113 then compares the decoded license information to the unique identifier for the node or AP received in the join message. If the decoded license information matches the unique identifier for the node or AP, the license is determined to be valid. The network manager 105 or license server 113 determine the license capabilities based on the decoded license information (e.g., from the 4 bytes encoding the licensed capabilities in the example above). If the decoded license information does not match the unique identifier of the node or AP, the license is deemed invalid.

Alternatively, a third-party can be used to certify licenses. In such an example, a network device with an embedded license would be programmed with license information in the factory. The license information would be registered with a reputable certifier accessible through the internet, such as a certifier running the license server 113. When a network manager 105 receives license information from a hardware device in such an embodiment, the network manager queries the certifier's license server 113 to determine the validity of the license.

As noted above, the embedded hardware license can be stored in APs of a network. Every network has at least one AP 103, and the AP 103 generally communicates with the network manager 103 over a wired interface. In some embodiments, the AP and the network manager are software programs that both run on a common platform, such as a microprocessor or a microcontroller with one or more CPU cores. Whether the AP 103 and network manager 105 are implemented in a same device or in different devices, instead of the user typing the license in on the network manager, the AP sends the license information string, e.g. of 13 bytes, to the network manager. The network manager can then perform cryptographic decryption to authenticate the license. If authenticated, the manager implements the capabilities described in the license.

However, the hardware license can also be embedded in a network node device 101. After the node 101 is joins the network wirelessly, the node 101 can send the license information over the wireless sensor network to the network manager 105 as its destination. In such an example, the node 101 joins the network and then sends the license information string to the network manager through the multi-hop network. The network manager can then perform cryptographic decryption to authenticate the license.

In some embodiments the license information is stored in a nonvolatile memory, such as a one-time programmable memory or a flash memory, of the node 101 or AP 103 which is written at the factory and not accessible to the end-user.

The authorizations provided by licenses of multiple network devices joined to a same network may be cumulative. For example, a customer may buy a first AP 103 which enables data notifications for one hundred nodes. As the network grows, the customer may buy another AP 103 with a license for one hundred nodes and join the other AP to the same network. Now, the network can support data notifications for two hundred nodes. However, if the network manager 105 detects that one of the APs 103 has left the network, the notification support for the network drops back to one hundred nodes. This is done to ensure that the license-holding devices (in this case, the APs 103) are not cycled through multiple networks to imbue each network with the license capabilities of the APs. Current and future network managers 105 both have mechanisms for detecting when devices are no longer in the network.

In some embodiments, because of uncertainties in joining order of the nodes 101 and APs 103 to a network, it can be desirable not to preclude other devices from joining the network. In such embodiments, all network devices can join the network. However, the network manager 105 may restrict the applications' 107 access to data notifications from the network to only receive notifications from the number of nodes for which a license is held. This approach enables the network to continue to function efficiently even if the license for receiving notifications from a central node of the network (e.g., a parent node through which packets to/from remote nodes are routed) is revoked. Specifically, since all nodes remain active even if notifications cannot be received from all nodes, network congestion is minimized even when a license-carrying device is removed from the network. The particular process for restricting license terms when a license-carrying device leaves the network can be a design choice; other actions may be taken when a license drops off the network instead.

An example implementation of a network using the hardware embedded license system detailed above will now be presented. In the example, a customer wants a 32-node network with 10 second data publishing from each node. As a result, the customer purchases an AP with a 32-node license and the lowest packet/second license which might be 10 packet/second of egress. The AP joins the network over the wired interface with the network manager, and starts to advertise to enable nodes to join the network. The AP sends the license to the manager immediately after joining. One-by-one, 32 nodes join the network; each node independently is checked for security credentials by the network manager to be allowed into the network (checking for node credentials may be a distinct authentication process from hardware license authorization and authentication). The network manager publishes data from all 32 nodes in the network to the customer's host application.

At some time, a $33^{rd}$ node which has the proper security credentials tries to join the network. The $33^{rd}$ node is allowed to join the network, to generate data packets, and to forward descendant data packets. However, the network manager does not publish data from the $33^{rd}$ node to the customer's host application. In turn, the customer purchases an additional AP with another 32-node license. Once the second AP joins the network, either over a wired or wireless interface, the AP sends its embedded license string to the network manager that authorizes another 32 nodes for the network. The manager authenticates the license; if it passes authentication, all subsequent data from the $33^{rd}$ node is published to the application since the total network capacity under license is now of 64 nodes.

If one of the APs is removed from the network, the network manager reverts to authorizing only 32 nodes in the network. Again, the network manager will not publish data from the $33^{rd}$ node to the customer's host application.

While in this example the APs store the license information, in other examples the license information can be stored in other hardware forming part of the network (e.g., in a node that joins the network, such as a functional node of the network or a dummy node or dongle that serves the limited purpose of carrying the license information). In general, the license information is coded in a permanent non-editable manner in the AP or node, for example by being implemented in hardware or in a read-only memory that is coded during production in a factory. In other examples, however, the license information can be stored in an editable memory, such as a re-writable electrically erasable programmable read-only memory (EEPROM). Other means of storing the license information can also be used.

The hardware-based licensing methods and systems for wireless network described herein advantageously embed the license in a part of the network other than (and outside of) the network manager; use a hardware-based license instead of a software-based license; transmit the license over a wireless network (in the case that the nodes are the devices with the embedded license); are able to "stack" features and limits by adding more licensed devices to benefit from the cumulative licenses of the devices; respond to the addition and/or removal of a license added to a wireless network in-situ; allow network capabilities to be field upgraded with a minimal customer effort by simply adding an additional network device having an appropriate embedded license; preserve network connectivity while limiting data notifications when a license exceeded; separate the function of security credentials from an application-layer-limiting license; and have a third-party verification scheme for a license on a device that joins the network.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A network manager operative to manage wireless network services using license information embedded in a hardware network device, comprising:
   a communication interface configured for communication with a plurality of hardware network devices including erodes or access points forming a wireless network, each hardware network device including a processor, a memory, and a wireless transceiver; and
   a processor operative to manage operation of the wireless network by performing functions to:
      receive, from at least one of the plurality of hardware network devices, license information embedded in the at least one hardware network device, and
      selectively disable services provided to the wireless network based on a number of nodes or access points designated by the received license information to be managed by the network manager.

2. The network manager of claim 1, wherein the network manager is in communication with a user application external to the wireless network, and the network manager provides a gateway for relaying communication between the user application and the nodes or access points of the wireless network, and
   wherein the network manager selectively disables communications relayed between the user application and the nodes or access points of the wireless network subject to the license information embedded within the at least one hardware network device.

3. The network manager of claim 2, wherein:
   the network manager receives, from the at least one hardware network device of the wireless network, identifying information for the at least one hardware network device, and
   the network manager validates the received license information using the received license information, the identifying information for the at least one hardware network device, and an encryption key.

4. The network manager of claim 1, wherein the selective disabling of services provided to the wireless network comprises:
   disabling publishing of notifications between nodes or access points (APs) and applications external to the wireless network when a total number of nodes or APs in the wireless network exceeds a maximum number in the license terms.

5. The network manager of claim 1, wherein, in response to the network manager determining that a hardware network device having license information embedded therein has left the wireless network, the network manager establishes revised license terms determined based on license information embedded within hardware network devices that remain joined to the wireless network and the network manager provides services to the wireless network subject to the revised license terms.

6. The network manager of claim 1, wherein the received license information is permanently stored in the at least one hardware network device, and the processor performs functions to selectively disable the services provided to the wireless network based on the number of nodes or access points designated by the license information permanently stored in the at least one hardware network device.

7. The network manager of claim 1, wherein the processor performs functions to receive, from each respective hardware network device of the plurality of hardware network devices, license information embedded in the respective hardware network device, to establish license terms based on the license information received from each of the plurality of hardware network devices, and to provide services to the wireless network subject to the established license terms.

8. The network manager of claim 1, wherein the processor further selectively disables services provided to the wireless network by disabling services when a hop-depth of the wireless network exceeds a maximum hop-depth designated by the received in the license information.

9. The network manager of claim 1, wherein the processor further authenticates the license information received from the at least one hardware network device and establishes license terms based on the license information received from the at least one hardware network device using only processing local to the network manager.

10. A method for managing wireless network services using license information embedded in a hardware network device, comprising:
    establishing, in a wireless network manager connected to a wireless network access point, a wireless network including the wireless network access point;
    receiving a network joining message in the network manager from a node in wireless communication with the network access point;
    authenticating the node in the network manager, and joining the node to the established wireless network;
    receiving in the network manager, from a hardware device of at least one of the wireless network access point and the node, license information embedded within the hardware device of the at least one of the wireless network access point and the node; and
    selectively disabling services provided by the network manager to the established wireless network based on a number of nodes or access points designated by the received license information to be managed by the network manager.

11. The method of claim 10, further comprising:
    relaying, via the network manager, communications between the wireless network node or access point and a user application external to the wireless network,
    wherein the relaying of communications comprises at least one of relaying communications from the wireless network node or access point to the user application and relaying communications from the user application to the wireless network node or access point, and
    wherein the selectively disabling of services provided by the network manager to the established wireless network comprises selectively disabling, by the network manager, of communications relayed between the wireless network node or access point and the user application subject to the received license information.

12. The method of claim 10, further comprising:
    receiving in the network manager, from the at least one of the wireless network access point and the node, identifying information for the at least one of the wireless network access point and the node; and
    validating the received license information using the received license information, the identifying information for the at least one of the wireless network access point and the node, and an encryption key.

13. The method of claim 10, wherein the selective disabling of services provided by the network manager to the established wireless network comprises:
    disabling peer-to-peer sessions established between nodes or access points (APs) of the wireless network when a number of peer-to-peer sessions exceeds a maximum number in the license terms.

14. The method of claim 10, further comprising:

determining, by the network manager, that a hardware device of at least one wireless network access point or node having license information embedded therein has left the wireless network;

in response to the determining, establishing in the network manager revised license terms determined based on license information embedded within hardware devices of wireless network access points and nodes that remain joined to the wireless network; and providing services, by the network manager to the wireless network, subject to the revised license terms.

15. A method for managing wireless network services by a wireless network manager using license information for the network, comprising:

establishing, in a wireless network manager connected to a wireless network access point, a wireless network including one or more existing wireless network nodes and the wireless network access point;

receiving in the wireless network manager a network joining message from a new node in wireless communication with the network access point;

authenticating the new node in the wireless network manager, and joining the new node to the established wireless network; and relaying, via the network manager, communications between a first node of the wireless network nodes or the access point, and the new node and a user application external to the wireless network, wherein the wireless network access point is a hardware device, and the network manager selectively disables the relaying of communications between each of the first node, the new node, the access point, and the user application based on a number of nodes or access points designated by license information to be managed by the wireless network manager.

16. The method of claim 15, further comprising:

receiving in the network manager, from at least one of the wireless network access point or new node, license information embedded within the at least one of the wireless network access point or new node, wherein the network manager selectively disables the relaying of communications between the new node or the wireless network access point and the user application subject to the received license information that is embedded in the hardware device.

17. The method of claim 16, further comprising:

receiving in the network manager, from the at least one of the wireless network access point or new node, identifying information for the at least one of the wireless network access point or new node; and validating the received license information using the received license information, the identifying information for the at least one of the wireless network access point or new node, and an encryption key.

18. The method of claim 16, further comprising:

determining, by the network manager, that at least one wireless network access point or new node having license information embedded therein has left the wireless network;

in response to the determining, establishing revised license terms determined based on license information embedded within wireless network access points and nodes that remain joined to the wireless network; and providing services, by the network manager to the wireless network, subject to the revised license terms.

19. The method of claim 15, wherein the network manager selectively disabling the relaying of communications comprises:

disabling publishing of notifications between nodes or access points (APs) and the user application when a rate at which the notifications are received exceeds a maximum rate in the license terms.

* * * * *